United States Patent
Chang

(10) Patent No.: US 8,220,015 B2
(45) Date of Patent: *Jul. 10, 2012

(54) ADDRESSING DEVICE FOR TRANSMITTING SATELLITE TELEVISION SIGNAL

(75) Inventor: Chieh-Pin Chang, Taoyuan County (TW)

(73) Assignee: Prime Electronics and Satellitics Inc., Chung-Li, Taoyuan County (TW)

( * ) Notice: Subject to any disclaimer, the term of this patent is extended or adjusted under 35 U.S.C. 154(b) by 357 days.

This patent is subject to a terminal disclaimer.

(21) Appl. No.: 12/709,660

(22) Filed: Feb. 22, 2010

(65) Prior Publication Data

US 2010/0154010 A1    Jun. 17, 2010

Related U.S. Application Data

(63) Continuation-in-part of application No. 11/745,206, filed on May 7, 2007, now Pat. No. 7,784,070.

(30) Foreign Application Priority Data

Oct. 8, 2009   (TW) .............................. 98218569 U

(51) Int. Cl.
*H04N 7/16*     (2011.01)
*H04N 7/167*    (2011.01)
*H04N 7/20*     (2006.01)

(52) U.S. Cl. .............................. 725/25; 725/31; 725/63

(58) Field of Classification Search .................... 725/25
See application file for complete search history.

(56) References Cited

U.S. PATENT DOCUMENTS

| | | |
|---|---|---|
| 5,621,793 A | 4/1997 | Bednarek et al. |
| 6,009,116 A | 12/1999 | Bednarek et al. |
| 6,108,365 A | 8/2000 | Rubin et al. |

*Primary Examiner* — Justin Shepard
(74) *Attorney, Agent, or Firm* — Browdy and Neimark, PLLC

(57) ABSTRACT

An addressing device for transmitting satellite TV signal is electrically connected with a satellite down-converter and at least one STB installed at a subscriber end. When the subscriber activates the STB for playing satellite TV channel programs, the satellite down-converter receives satellite signals provide by a satellite system end and processes the satellite signals to generate baseband satellite TV signal for input into the addressing device. Next, the addressing device receives GPS signal indicating the position where it is installed and then addresses the GPS signal, further executing digital security processes to converting the area address into an address signal having the same transmission frequency as that of the baseband satellite TV signal. Finally, the address signal is mixed with the baseband satellite TV signal for output to the STB.

10 Claims, 4 Drawing Sheets

ADDRESSING DEVICE FOR TRANSMITTING SATELLITE TELEVISION SIGNAL

CROSS REFERENCE TO RELATED APPLICATIONS

The present application is a continuation-in-part of U.S. patent application Ser. No. 11/745,206 entitled SATELLITE SIGNAL RECEIVE AND METHOD OF CONDITIONALLY ACCESSING DIGITAL TV PROGRAM BY USING THE SAME filed on May 7, 2007 now U.S. Pat. No. 7,784,070, the disclosure of which is incorporated herein by reference.

BACKGROUND OF THE INVENTION

1. Field of the Invention

The present invention relates generally to satellite global positioning systems (GPS), and more particularly, to an addressing device for restriction of receiving satellite television (TV) signal within an authorized location.

2. Description of the Related Art

Following development of broadband technology, multi-channel selected satellite video service enables more and more satellite TV subscribers day by day. Under the consideration of commercial benefit, a system provider usually limits the subscribers to conditionally receive digital TV signal (digital TV program) under authorization. Therefore, the Set-Top-Box (STB) has built therein with a processor for recognizing the authorization, which compares an authorization code carried in the satellite signal provided by the system end with the built-in code, and then outputs the digital TV signal (program) when the comparison is matched.

When a system provider owns more satellites, the provider can provide more different satellite TV channels for a variety of regions around the world; meanwhile, the provider serves different value added programs for the authorized subscribers of different regions and charges at different charging rates. In this way, an authorized subscriber also has to install a respective STB with a specific identification for accessing digital TV signal in each respective region, i.e. any region where satellite signal of the system provider is available. For example, U.S. Pat. Nos. 5,621,793, 6,009,116 & 6,108,365 each disclosed that a satellite TV receiving system, in which an outdoor satellite receiver can encrypt both of the satellite TV signal and the GPS addressing signal. The indoor STB of the subscriber needs to have a comparable GPS signal addressed at where the STB installs to match with the encrypted GPS addressing signal for enabling the subscriber to watch the digital TV of the respective zone. Therefore, the STB is an integrated circuit which can transmit and process both of the satellite TV and GPS signals, so the product of the STB costs a lot for making the circuit. In this way, while installing the digital TV system, the subscriber also needs to spend a lot doing so. Besides, the high-frequency GPS signal, transmitted straight by an GPS antenna integrated with the STB, is subject to attenuation within limited indoor space, so that the receiving quality of the GPS antenna of the indoor STB installed at the area having buildings of high density is vulnerable to be blocked by the buildings. For this reason, the integration of a GPS receiver with the indoor STB is unavoidable from GPS addressing error, even resulting in that the authorized subscriber is unable to receive the satellite channels due to the addressing error.

FIG. 4 illustrates a conventional satellite TV receiving system 1, which includes a satellite signal receiving device 11 capable of GPS addressing disclosed by the present inventor in the U.S. patent application Ser. No. 11/745,206. In light of this, the satellite TV system end can restrict a subscriber within a specific area receiving digital TV signal only by an STB connected to the satellite signal receiving device 11, and all of the subscribers in the same community only need to set one outdoor down-converter as the satellite signal receiving devices 11 and install the recognition program processed for GPS address recognition in the STB 12 of every subscriber. In this way, the indoor STB 12 of every subscriber does not need the high-cost GPS functionally integrated circuit, and the GPS signal processing circuit integrated inside the outdoor satellite signal receiving device 11 can decrease the GPS addressing error and then avoid missing the signal reception of the subscriber ends.

Because the outdoor satellite signal receiving device 11 is mounted to the focal center of a satellite dish 10, it needs to maintain a specific angle reflectively directing to a communication satellite for transmission of satellite signal. However, under the limitation of different bandwidth between the GPS communication and satellite TV transmission, it is difficult for the reception angle of the satellite dish 10 toward the satellite for GPS communication as well as toward that for the satellite TV transmission.

For these reasons mentioned all above, the conventional digital TV receiving system need improvement for optimal recognition of the GPS signal and reception of the satellite TV to ensure that the subscribers can accurately obtain high-quality satellite video services.

SUMMARY OF THE INVENTION

The primary objective of the present invention is to provide an addressing device for transmitting satellite TV signal, which can enable optimal recognition of the GPS signal and reception of the satellite TV signal to ensure that the subscribers can accurately obtain high-quality satellite video service.

The foregoing objective of the present invention is attained by the addressing device electrically connected with a satellite down-converter and at least one STB installed at the satellite TV subscriber end. The addressing device includes built-in digital security processing programs, like encoding, scrambling, and encryption, corresponding to the decoding, descrambling, and decryption programs built in the STB respectively. When the subscriber activates the STB to play satellite TV channel programs, the satellite down-converter can receive satellite signal sent from a satellite TV system provider to generate baseband satellite TV signal for the addressing device. The addressing device can receive the GPS signal indicating to the position where the addressing device installs and convert the GPS signal into an addressing signal having the same transmission frequency as that of the aforesaid baseband satellite TV signal, and then the addressing signal is mixed with the baseband satellite signal for output to the STB. The STB converts the addressing signal into an area address corresponding to the GPS signal and compares it with a built-in authorized address of the STB. If the area address conforms to the authorized address, the STB can play the satellite TV channel programs authorized by the satellite TV system end. On the contrary, the STB 40 cannot play any unauthorized satellite TV channel programs.

DETAILED DESCRIPTION OF PREFERRED EMBODIMENTS

Figure 1:
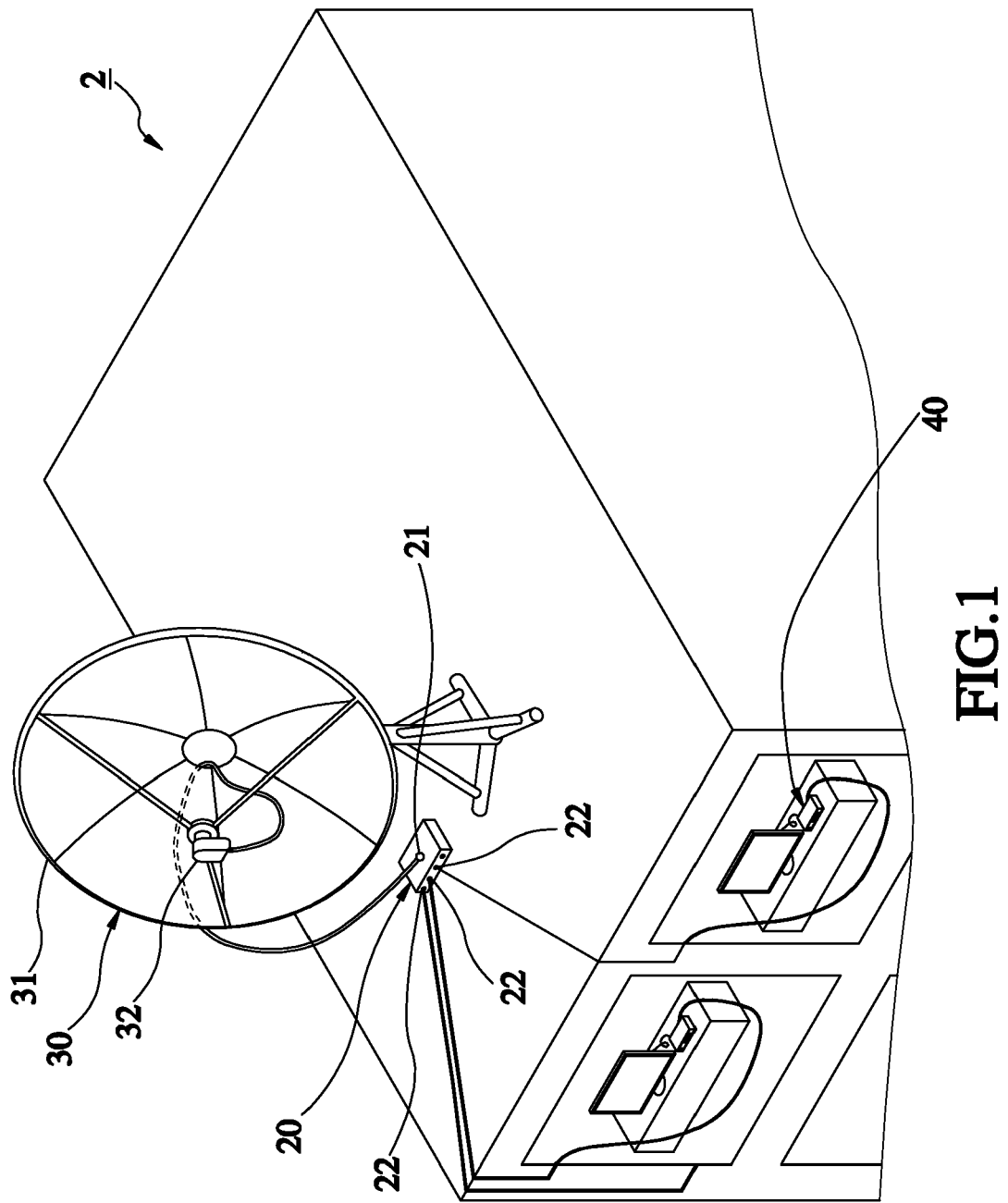
FIG. 1 is a schematic view of a preferred embodiment of the present invention.

Referring to FIG. 1, an addressing device 20 constructed according to a preferred embodiment of the present invention is interconnected with a conventional satellite signal receiving device 30 and at least one STB 40 to become a satellite signal receiving system 2. The addressing device 20 includes a first connector 21 and a plurality of second connectors 22. The first connector 21 is electrically connected with the satellite signal receiving device 30. Each of the second connectors 22 is electrically connected with the STB 40 of the respective subscriber.

The satellite signal receiving device 30 includes a satellite antenna 31 and a satellite down-converter 32. The satellite antenna 31 can collect satellite signal provided by a satellite TV provider. The satellite signal is focalized to the down-converter 32 and then processed with amplification, down-conversion, wave filtration, and division to constant frequencies by an internal high-frequency circuit of the down-converter 32, finally outputting a baseband satellite TV signal carried with the constant frequencies to the addressing device 20.

The STB 40 of the present invention is similar to the STB 12 of a conventional digital TV receiving system 1 disclosed by the U.S. patent application Ser. No. 11/745,206, functioning as the same recognition. The difference between them lies in that the STB 40 receives the baseband satellite TV signal which is processed and outputted directly from the addressing device 20 rather than the satellite signal receiving device as the prior patent disclosed. Then, the same process of converting them into digital or analogous video/audio signal follows the authorization and recognition, for outputting a desired channel program via a video/audio player.

Figure 2:
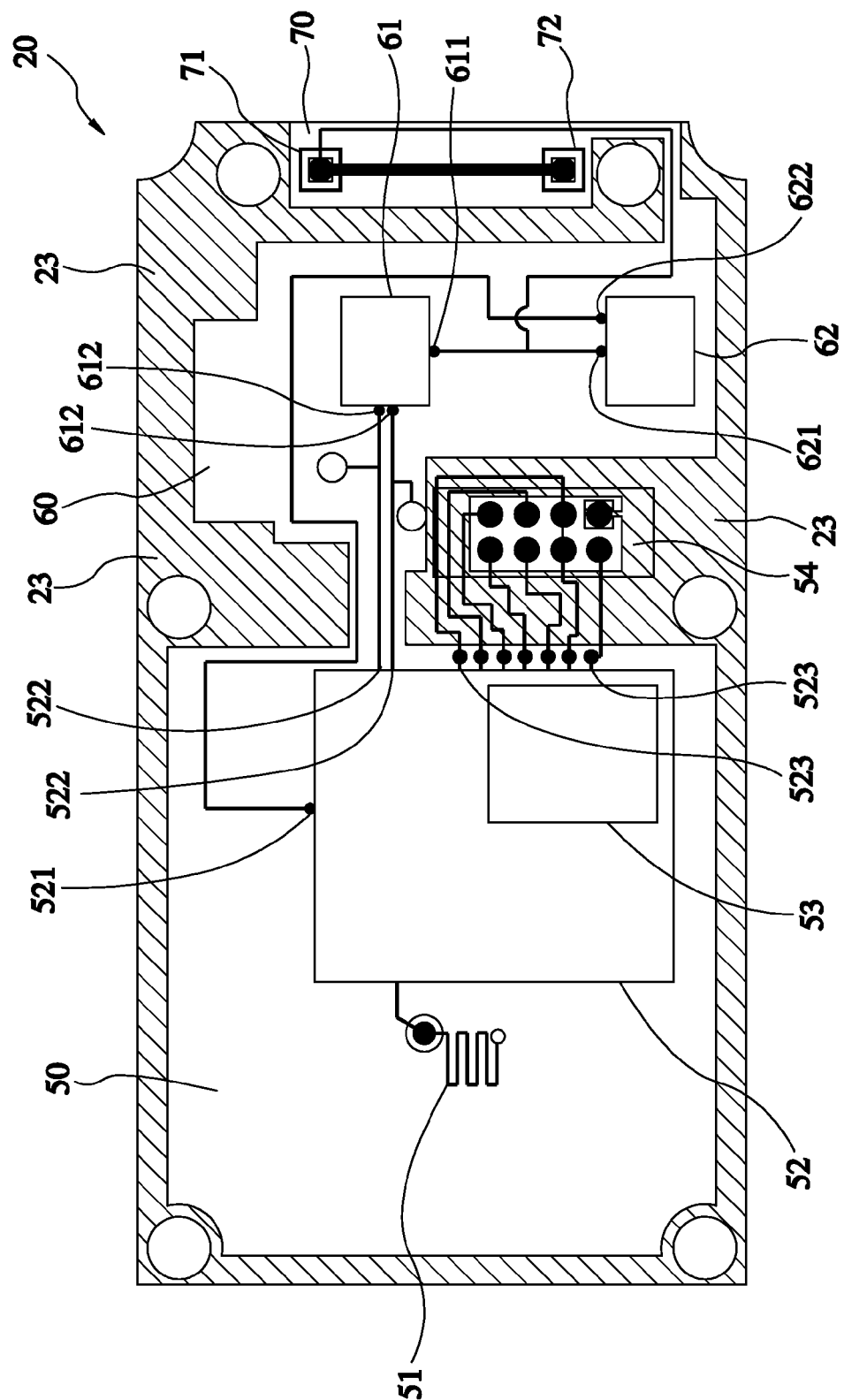
FIG. 2 is a sectional view of a part of the preferred embodiment of the present invention.

Referring to FIG. 2, the addressing device 20 includes a GPS processing zone 50, a control circuit zone 60, and a baseband transmission zone 70. Some high-frequency shielding members 23 are mounted between the three zones 50, 60 & 70. Each of the high-frequency shielding members 23 is electrically connected to a grounding potential for lowering the mutual interference of circuit noises and for blocking the three zones 50, 60 & 70 from interference of environmental noises during signal transmission. The three zones 50, 60 & 70 are recited respectively in the following paragraphs.

The GPS processing zone 50 includes a GPS antenna 51, a GPS chip 52, and a memory device 53. The antenna 51 is to transmit GPS signal for the GPS chip 52 to carry out satellite positioning operation. The GPS chip 52 includes a power terminal set 521, a first transmission terminal set 522, and a communication interface 523. The power terminal set 521 is to receive a DC operation voltage required by the GPS chip 52. The memory device 53 is provided with built-in digital security processing programs, like encoding, scrambling, and encryption, which are accessed by the GPS chip 52. The memory device 53 can be integrated with the GPS chip 52 or optionally modularized with the GPS chip 52, while either of the options, a communication bus 54 is electrically connected therewith via the communication interface 523 of the GPS chip 52. The communication bus 54 is mounted to the high-frequency shielding member 23 and between the GPS processing zone 50 and the control circuit zone 60 for external connection with a computer in such a way that a system provider can conveniently update or write the program into the memory device 53. After the GPS antenna 51 receives the GPS signal indicating the position where the addressing device 20 installs, the GPS chip 52 addresses the GPS signal and accesses the memory device 53 for executing the digital security processing programs and then outputs an address data via the first transmission terminal set 522.

The control circuit zone 60 includes a transmission control chip 61 and a power regulator 62. The transmission control chip 61 has an integrated transmission terminal set 611 and a second transmission terminal set 612. The integrated transmission terminal set 611 has the signal transmission characteristics consistent with the aforesaid baseband satellite TV signal and is capable of receiving control command and DC operation voltage required for the transmission control chip 61. The second transmission terminal set 612 is electrically connected with the first transmission terminal set 522 of the GPS chip 52. When the second transmission terminal set 612 receives the address data outputted by the GPS chip 52, the transmission control chip 61 converts the address data into an addressing signal having the same transmission frequency as that of the baseband satellite TV signal and then the addressing signal is outputted via the integrated transmission terminal set 611. The power regulator 62 has an input terminal set 621 electrically connected with the integrated transmission terminal set 611 of the transmission control chip 61 and an output terminal set 622 electrically connected with the power terminal set 521 of the GPS chip 52. When the integrated transmission terminal set 611 detects the DC potential, the input terminal set 621 of the power regulator 62 detects as well. Then the DC potential is converted into the operation voltage required by the GPS chip 52 and transmitted to the power terminal set 521 via the output terminal set 622.

The baseband transmission zone 70 includes a first connection terminal set 71 electrically connected with the first connector 21 and a second connection terminal set 72 electrically connected with the second connectors 22. The first and second connection terminal sets 71 and 72 are electrically connected with each other and formed of the same transmission characteristics consistent with the baseband satellite TV signal. Also the first connection terminal set 71 is electrically connected with the integrated transmission terminal set 611 of the transmission control chip 61. In this way, each of the first and second connectors 21 and 22 can be electrically connected to the integrated transmission terminal set 611 via the baseband transmission zone 70 as long as either of the first or second connection terminal sets 71 or 72 is electrically connected with the integrated transmission terminal set 611, it is not limited to the electric connection via the first connection terminal set 71 as the present embodiment disclosed.

Figure 3:
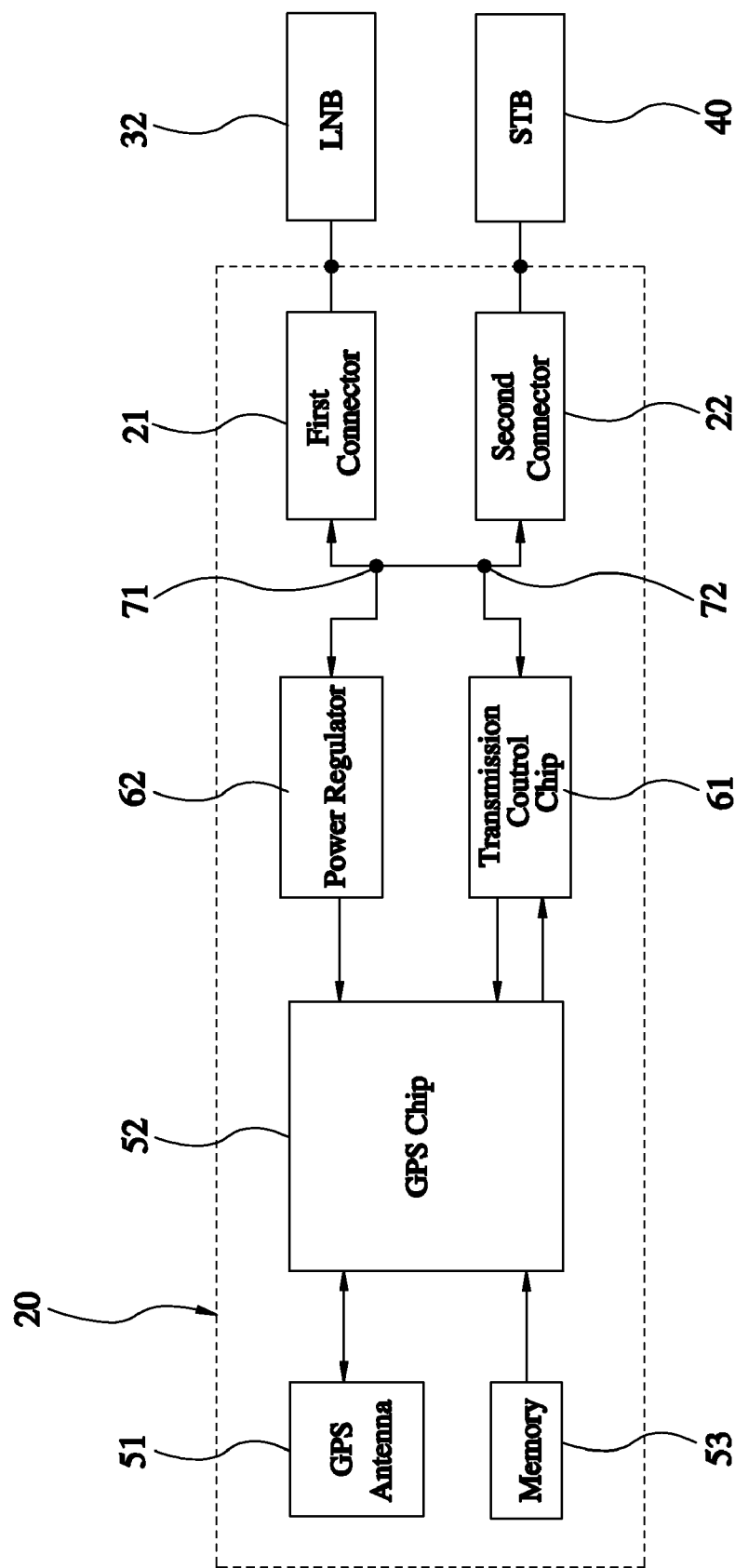
FIG. 3 is a circuit diagram of the preferred embodiment of the present invention.
Figure 4:
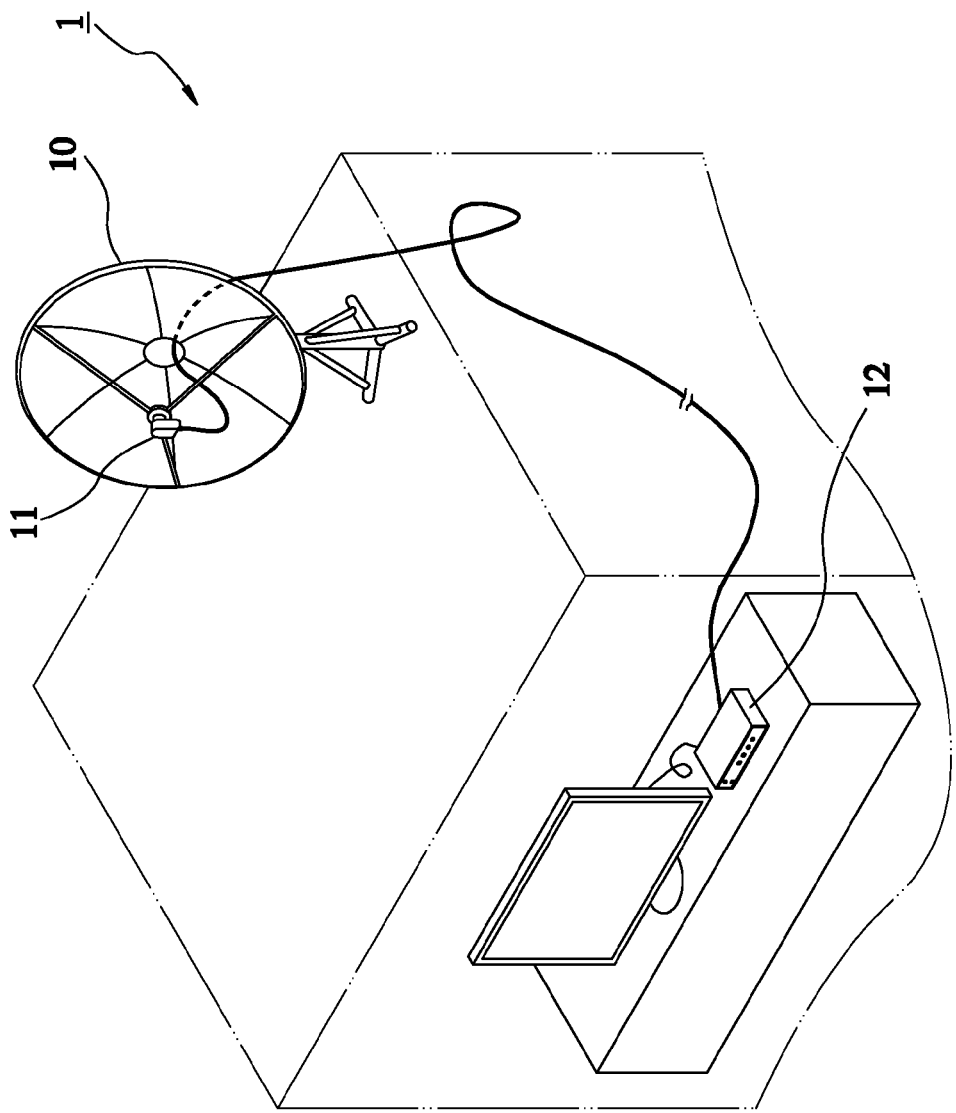
FIG. 4 is a schematic view of a conventional digital TV receiving system of U.S. patent application Ser. No. 11/745,206.

Referring to FIG. 3, when a satellite TV subscriber turns on the STB 40 indoors, the control command and the DC potential carried therewith are sent out from the STB to the second connector 22 and then passes through the first connection terminal set 71 and the integrated transmission terminal set 611 to activate the addressing device 20. In the meantime, the power regulator 62 detects the DC potential and then converts the DC potential into the DC operation voltage required by the GPS chip 61. Next, the GPS antenna 51 is activated to send out and receive back the GPS signal to accomplish the satellite positioning function, and then the GPS chip 52 addresses the GPS signal and carries out the digital security processing to generate address data. After the transmission control chip 61 converts the address data into addressing signal, the addressing signal can be outputted by the integrated transmission terminal set 611 to the first connection terminal set 71. When the addressing device 20 is activated, the down-converter 32 of the satellite signal receiving device 30 also receives the control command and the DC potential via the addressing device 20, such that the satellite signal receiving device 30 is activated to receive the satellite signal provided by the satellite TV system provider. When the subscriber controls the STB 40 to select desired satellite TV channels, the down-converter 32 converts the satellite signal corresponding to the subscriber's control command into the baseband satellite TV signal and then transmits it to the first connector 21. Therefore, when the first connection terminal set 71 receives the baseband satellite TV signal, the address signal outputted by the transmission control chip 61 is mixed with the baseband satellite TV signal and then transmitted together to the second connection terminal set 72 for output to the STB 40.

When the satellite TV system provider initially installs the satellite signal receiving system 2 at the subscriber end, the memory device 53 of the addressing device 20 has the built-in encoding, scrambling, and encryption programs, and the STB 40 is set to built in the corresponded decoding, descrambling, and decryption programs respectively, such that an authorized address converted from the result of satellite positioning in which the addressing device 20 is installed is generated and provided for the STB 40. Once the subscriber activates the STB 40 to play the satellite TV channel programs, the satellite antenna 31 receives the satellite signal sent out from the system end, the GPS antenna 51 receives the GPS signal, and then the baseband transmission zone 70 mixes the baseband satellite TV signal processed by the satellite down-converter 32 with the address signal processed by the transmission control chip 61 for output to the STB 40. Next, the STB 40 converts the address signal into an area address corresponding to the GPS signal and compares the area address with the authorized address built in the STB 40; if the area address conforms to the authorized address, the STB 40 can play the satellite TV channel authorized by the satellite TV system end; on the contrary, the STB 40 cannot play any unauthorized satellite TV channel.

In this way, even if the subscriber carries the STB 40 to another area for connection with the satellite signal receiving device 30 installed by the system provider or with another addressing device, the STB 40 does not have the authorized address corresponding this area as well as the decoding, descrambling, and decryption programs corresponding to the addressing device installed in the area, such that it fails to play the satellite TV channel programs provided in the area. In addition, the addressing device of the present invention is installed outdoors and separated from the satellite signal receiving device, such that decreases the recognition error of the GPS positioning to cause optimal receptions and recognitions of the satellite TV signal and the GPS signal for ensuring the subscriber to accurately receive the high-quality satellite video/audio service.

Although the present invention has been described with respect to a specific preferred embodiment thereof, it is in no way limited to the specifics of the illustrated structures but changes and modifications may be made within the scope of the appended claims.

What is claimed is:

1. An addressing device for transmitting satellite TV signal and being electrically connected with a satellite down-converter and at least one STB installed at a satellite TV subscriber, the addressing device comprising:

a GPS processing zone having a GPS chip, the GPS chip having a power terminal set and a first transmission terminal set, the power terminal set being adapted for receiving a DC operation voltage required by the GPS chip, whereby the GPS chip is operative for addressing the position where the addressing device installed and then carrying out digital security processing to output an address data via the first transmission terminal set;

a control circuit zone having a transmission control chip and a power regulator, the transmission control chip having a second transmission terminal set electrically connected with the first transmission terminal set of the GPS chip and an integrated transmission terminal set adapted for receiving a DC operation voltage required by the transmission control chip, whereby the transmission control chip can convert the address data outputted by the GPS chip into an address signal having the same transmission frequency as that of the aforesaid satellite TV signal and then the address signal is outputted via the integrated transmission terminal set, the power regulator being electrically connected with the power terminal set of the GPS chip and the integrated terminal set for converting the DC operation voltage of the transmission control chip into that of the GPS chip; and a baseband transmission zone having two connection terminal sets electrically connected with the satellite down-converter and the STB respectively, the two connection terminal sets being electrically connected to the integrated transmission terminal set with the same transmission characteristics.

2. The addressing device as defined in claim 1, wherein the GPS chip comprises a communication interface, the communication interface being electrically connected with a memory device, the memory device having a plurality of digital security processing programs which the GPS chip can access, the addressing device further comprising a communication bus electrically connected with the communication interface.

3. The addressing device as defined in claim 2 further comprising a high-frequency shielding member, wherein the high-frequency shielding member is located around the GPS processing zone and electrically conducted to a grounding potential; the communication bus is mounted to the high-frequency shielding member.

4. The addressing device as defined in claim 1 further comprising at least one high-frequency shielding member, wherein the at least one high-frequency shielding member is adjacent to the GPS processing zone, the control circuit zone, and the baseband transmission zone and electrically conducted to a grounding potential.

5. The addressing device as defined in claim 1, wherein the baseband transmission zone comprises a first connection terminal set and a plurality of second connection terminal sets, the first connection terminal set being electrically connected with the satellite down-converter and the integrated transmission terminal set, each of the second connection terminal sets being electrically connected with each STB.

6. An addressing device for transmitting satellite TV signal, comprising:

a GPS chip having a power terminal set and a first transmission terminal set, the power terminal set being adapted for receiving a DC operation voltage required by the GPS chip, whereby the GPS chip is operative for addressing the position where the addressing device is installed and then carries out digital security processing to output address data via the first transmission terminal set;

a transmission control chip having a second transmission terminal set electrically connected with the first transmission terminal of the GPS chip and an integrated transmission terminal set for receiving a DC operation voltage required by the transmission control chip, whereby the transmission control chip can convert the address data outputted by the GPS chip into an address signal having the same transmission frequency as that of the satellite TV signal and then the address signal can be outputted via the integrated transmission terminal set; and a power regulator electrically connected with the power terminal set of the GPS chip and the integrated transmission terminal set of the transmission control chip for converting the DC operation voltage of the transmission control chip into that of the GPS chip.

7. The addressing device as defined in claim 6, wherein the GPS chip comprises a communication interface electrically connected with a memory device, the memory device having a plurality of digital security processing programs which the GPS chip can access, the addressing device further comprising a communication bus electrically connected with the communication interface.

8. The addressing device as defined in claim 7 further comprising a high-frequency shielding member, wherein the high-frequency shielding member is located around the GPS chip and electrically conducted to a grounding potential; the communication bus is mounted to the high-frequency shielding member.

9. The addressing device as defined in claim 6 further comprising a high-frequency shielding member, wherein the high-frequency shielding member is located between the GPS chip and the power regulator and electrically conducted to a grounding potential.

10. The addressing device as defined in claim 6 further comprising two connection terminal sets for transmitting the satellite TV signal, wherein either of the two connection terminal sets is electrically connected with the integrated transmission terminal set.

* * * * *